(12) United States Patent
Iijima et al.

(10) Patent No.: US 8,398,757 B2
(45) Date of Patent: Mar. 19, 2013

(54) CO₂ RECOVERING APPARATUS

(75) Inventors: Masaki Iijima, Hiroshima (JP);
Masahiko Tatsumi, Hyogo (JP);
Yasuyuki Yagi, Hyogo (JP); Kouki Ogura, Hyogo (JP)

(73) Assignees: Mitsubishi Heavy Industries, Ltd., Tokyo (JP); The Kansai Electric Power Co., Inc., Osaka (JP)

(*) Notice: Subject to any disclaimer, the term of this patent is extended or adjusted under 35 U.S.C. 154(b) by 6 days.

(21) Appl. No.: 12/608,286

(22) Filed: Oct. 29, 2009

(65) Prior Publication Data
US 2010/0307344 A1 Dec. 9, 2010

(30) Foreign Application Priority Data
Jun. 4, 2009 (JP) ................................. 2009-134947

(51) Int. Cl.
*B01D 53/14* (2006.01)
(52) U.S. Cl. ............... 96/234; 96/240; 96/262; 96/296; 96/331; 96/333; 96/183; 96/210; 96/226; 96/236
(58) Field of Classification Search .................. 96/234
See application file for complete search history.

(56) References Cited

U.S. PATENT DOCUMENTS

| | | | |
|---|---|---|---|
| 3,075,914 A * | 1/1963 | Goodmann et al. | 208/199 |
| 3,516,799 A | 6/1970 | Dotson | |
| 5,820,837 A * | 10/1998 | Marjanovich et al. | 423/220 |
| 6,146,603 A | 11/2000 | Chakravarti et al. | |
| 6,689,332 B1 | 2/2004 | Yoshida et al. | |
| 7,326,333 B2 * | 2/2008 | Laricchia et al. | 208/226 |
| 2001/0026779 A1 | 10/2001 | Chakravarti et al. | |
| 2004/0250684 A1 * | 12/2004 | Krumdieck et al. | 96/290 |
| 2005/0155925 A1 | 7/2005 | Schipper | |
| 2011/0052453 A1 * | 3/2011 | McLarnon et al. | 422/170 |

FOREIGN PATENT DOCUMENTS

| | | |
|---|---|---|
| CA | 2311202 A1 | 5/2004 |
| DE | 10002982 A1 | 8/2001 |

(Continued)

OTHER PUBLICATIONS

Citing the definition of "grille" as found in Merriam-Webster Dictionary online. www.merriam-webster.com/dictionary/grille (Jan. 30, 2012).*
Extended European Search Report, issued May 12, 2010 for corresponding European Patent Application No. 09174655.2.
Canadian Office Action dated Jun. 13, 2011, issued in corresponding Canadian Patent Application No. 2,684,156.

(Continued)

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

A $CO_2$ recovering apparatus includes a $CO_2$ absorber that brings flue gas containing $CO_2$ and $O_2$ into contact with $CO_2$ absorbing liquid to reduce $CO_2$ in the flue gas; and a regenerator that reduces $CO_2$ in $CO_2$ absorbing liquid (rich solvent) that absorbed $CO_2$ in the $CO_2$ absorber to regenerate the $CO_2$ absorbing liquid, so that the regenerated $CO_2$ absorbing liquid (lean solvent) having $CO_2$ reduced in the regenerator is reused in the $CO_2$ absorber. A lower liquid reservoir is located at the bottom of the $CO_2$ absorber, and an air-bubble gathering member is arranged therein to gather air bubbles included in the absorbing liquid.

2 Claims, 2 Drawing Sheets

FOREIGN PATENT DOCUMENTS

| | | |
|---|---|---|
| DE | 10310395 A1 | 9/2004 |
| GB | 2096916 A | 10/1982 |
| JP | 57-169403 U | 10/1982 |
| JP | 63-58611 U | 4/1988 |
| JP | 03-193116 A | 8/1991 |
| JP | 2001-19416 A | 1/2001 |
| JP | 2001-25628 A | 1/2001 |
| JP | 2004-524147 A | 8/2004 |
| JP | 2007-137725 A | 6/2007 |
| WO | 02/064238 A1 | 8/2002 |

OTHER PUBLICATIONS

Japanese Office Action dated Sep. 18, 2012, issued in corresponding Japanese Patent Application No. 2009-134947, with English translation (3 pages).

* cited by examiner

CO₂ RECOVERING APPARATUS

BACKGROUND OF THE INVENTION

1. Field of the Invention

The present invention relates to a $CO_2$ recovering apparatus for reducing an amount of $O_2$ accompanying oxygen absorbing liquid, and reducing the concentration of oxygen contained in the $CO_2$ gas regenerated in a regenerator.

2. Description of the Related Art

It has come to be pointed out that one of the causes of the global warming is a greenhouse effect of $CO_2$, and it has became an urgent task, also internationally, to provide a countermeasure for $CO_2$ to protect the global environment against the warming. $CO_2$ is generated by any human activities combusting fossil fuels, and there are increasing demands for suppressing $CO_2$ emissions. Along with such an increasing demand, researchers are energetically investigating a method for reducing and recovering $CO_2$ included in flue gas, to apply in a power plant that consumes a large amount of fossil fuels, such as a thermal plant. In such a method, flue gas emitted from a steam generator is brought into contact with an amine-based $CO_2$ absorbing liquid to allow such absorbing liquid to absorb the $CO_2$, and the recovered $CO_2$ is stored therein without being released into the air. As processes for reducing and recovering $CO_2$ from the flue gas using the $CO_2$ absorbing liquid, Japanese Patent Application Laid-open No. H3-193116, for example, brings flue gas into contact with the $CO_2$ absorbing liquid in an absorber, heats an absorbing liquid that has absorbed $CO_2$ in a regenerator, isolates $CO_2$ as well as regenerates the absorbing liquid, and circulates the absorbing liquid back to the absorber and reuses the absorbing liquid therein.

As shown in FIG. 2, a conventional $CO_2$ recovering apparatus 100 as mentioned above includes a flue gas cooler 14, a $CO_2$ absorber 16, and a regenerator 18. The flue gas cooler 14 cools flue gas 12 containing $CO_2$ and $O_2$ emitted from an industrial combustion facility 11, such as a steam generator or a gas turbine, with cooling water 13. The $CO_2$ absorber 16 further includes a $CO_2$ recovering unit 16A. The $CO_2$ recovering unit 16A brings the flue gas 12, containing the cooled $CO_2$, into contact with $CO_2$ absorbing liquid (hereinafter, also referred to as "absorbing liquid") 15 that absorbs $CO_2$, to reduce $CO_2$ in the flue gas 12. The regenerator 18 causes $CO_2$ absorbing liquid (hereinafter, also referred to as "rich solvent") 17 that has absorbed $CO_2$ to release $CO_2$ to regenerate the $CO_2$ absorbing liquid.

In the $CO_2$ recovering apparatus 100, the regenerated $CO_2$ absorbing liquid (hereinafter, also referred to as "lean solvent") 15 having $CO_2$ reduced in the regenerator 18 is reused in the $CO_2$ absorber 16 as the $CO_2$ absorbing liquid.

By a $CO_2$ recovering method using the $CO_2$ recovering apparatus 100, a flue gas booster fan 20 raises the pressure of the flue gas 12 emitted from an industrial combustion facility such as a steam generator or a gas turbine and containing $CO_2$. The flue gas 12 is then sent into the flue gas cooler 14, cooled by way of the cooling water 13, and then sent into the $CO_2$ absorber 16.

The $CO_2$ absorber 16 then brings the flue gas 12 in a counter-current contact with the $CO_2$ absorbing liquid 15 that is based on amine-based solvent, allowing the $CO_2$ absorbing liquid 15 to absorb the $CO_2$ contained in the flue gas 12 by way of chemical reaction ($R-NH_2+H_2O+CO_2 \rightarrow R-NH_3HCO_3$).

A washing unit 16B, included in the $CO_2$ absorber 16, brings the flue gas having $CO_2$ reduced in the $CO_2$ recovering unit 16A into a gas-liquid contact with circulating condensate water 19. The condensate water 19 contains the $CO_2$ absorbing liquid, and is supplied via a nozzle included in a washing unit 16B. In this manner, the $CO_2$ absorbing liquid 15 that has accompanied the flue gas having $CO_2$ reduced is recovered. Flue gas 12 having $CO_2$ reduced is released out of the system.

A rich solvent pump 22 increases the pressure of the rich solvent that is the $CO_2$ absorbing liquid 17 that has absorbed $CO_2$. Then, a rich/lean solvent heat exchanger 23 heats the rich solvent by way of the $CO_2$ absorbing liquid 15 that is lean solvent regenerated by the regenerator 18, and supplied into the regenerator 18.

The rich solvent discharged into the regenerator 18 through the top thereof causes an exothermal reaction, thus releasing a majority of $CO_2$. The $CO_2$ absorbing liquid that has released some or a majority of $CO_2$ in the regenerator 18 is called semi-lean solvent. By the time the semi-lean solvent reaches the bottom of the regenerator 18, almost all of the $CO_2$ is removed, turning the semi-lean solvent into the absorbing liquid 15. A regenerating heater 24 then heats the lean solvent by way of steam 25, supplying steam inside the regenerator 18.

$CO_2$ gas 26 is guided out from the top of the regenerator 18, together with the steam that has been released from the rich solvent and semi-lean solvent in the regenerator 18. A condenser 27 then condenses steam contained in the $CO_2$ gas 26, and a separation drum 28 separates water from the $CO_2$ gas 26. The $CO_2$ gas 26 is then released out of the system, and recovered separately. The recovered $CO_2$ gas 26 is injected into an oilfield using enhanced oil recovery (EOR) method, or stored in an aquifer as a countermeasure for global warming.

The water separated in the separation drum 28 is pumped up to the top of the regenerator 18 by way of a condensed-water circulating pump 29. The rich/lean solvent heat exchanger 23 cools the regenerated $CO_2$ absorbing liquid (lean solvent) 15 by way of the rich solvent 17. A lean solvent pump 30 then increases the pressure of the lean solvent 15. After being cooled down by a lean solvent cooler 31, the lean solvent 15 is supplied into the $CO_2$ absorber 16.

In FIG. 2, the reference numeral 11a denotes to a flue for the flue gas 12; the reference numeral 11b denotes to a stack; and the reference numeral 32 denotes to steam-condensed water. The $CO_2$ recovering apparatus may be either added to an existing flue gas source to recover $CO_2$, or installed with a flue gas source that is to be newly installed. A door that can be opened and closed is attached on the stack 11b. The door is closed while the $CO_2$ recovering apparatus is operating, and opened while the flue gas source is operating but the $CO_2$ recovering apparatus is not operating.

When the flue gas 12 containing $CO_2$ is brought into contact with $CO_2$ absorbing liquid 15 in the $CO_2$ absorber 16, air bubbles can get caught in the absorbing liquid that has flowed down in the $CO_2$ absorber at the bottom thereof, and the rich solvent 17 is stored with the bubbles being caught.

The air bubble contains oxygen ($O_2$) that is also a constituent of the flue gas 12. Although the concentration of oxygen dissolved in the absorbing liquid is generally approximately 25 parts per million, the concentration of the oxygen in the air bubbles being caught in the absorbing liquid could reach approximately 100 parts per million.

Upon transporting $CO_2$ containing oxygen via a pipeline, if $CO_2$ containing $H_2S$, supplied from another $CO_2$ source, is mixed therewith, $H_2S$ may react to oxygen, resulting in deposit of solid sulfur (S). Therefore, there is a demand for reducing oxygen ($O_2$) as much as possible.

Furthermore, upon injecting $CO_2$ into an oilfield using EOR, oxygen could cause facility corrosion. Moreover, if oxygen is mixed to $CO_2$ when the recovered $CO_2$ gas is used for chemical applications, a catalyst may get deteriorated. Therefore, it is desired to reduce oxygen from $CO_2$ as much as possible.

Published Japanese Translation of PCT Application No. 2004-524147, for example, suggests using a flash tank or a vacuum pump to reduce oxygen in absorbing liquid.

However, in the oxygen reducing technology according to the Published Japanese Translation of PCT Application No. 2004-524147, a separate reducing apparatus such as a flash tank or a vacuum pump is required, thus further requiring facility cost and reduction energy, resulting in a cost increase.

SUMMARY OF THE INVENTION

The present invention is invented in consideration of the above. An object of the present invention is to provide a $CO_2$ recovering apparatus that can suppress air bubbles getting caught in $CO_2$ absorbing liquid.

According to an aspect of the present invention, a $CO_2$ recovering apparatus includes: a $CO_2$ absorber that brings flue gas containing $CO_2$ and $O_2$ into contact with $CO_2$ absorbing liquid to reduce $CO_2$ in the flue gas; a regenerator that reduces $CO_2$ in rich solvent that absorbed $CO_2$ in the $CO_2$ absorber to regenerate the $CO_2$ absorbing liquid, so that lean solvent having $CO_2$ reduced in the regenerator is reused in the $CO_2$ absorber; and an air-bubble gathering member being located in a lower liquid reservoir of the $CO_2$ absorber to gather air babbles included in the $CO_2$ absorbing liquid.

Advantageously, in the $CO_2$ recovering apparatus, the air-bubble gathering member is made of an assemblage of wire or fibrous material, or filler or sintered metal.

Advantageously, in the $CO_2$ recovering apparatus, the air-bubble gathering member is arranged so as to be dipped near or below liquid surface of the lower liquid reservoir.

DETAILED DESCRIPTION OF THE PREFERRED EMBODIMENTS

Embodiments of the $CO_2$ recovering apparatus according to the present invention will now be explained in detail with reference to drawings. The embodiments are not intended to limit the scope of the present invention.

First Embodiment

A $CO_2$ recovering apparatus according to a first embodiment of the present invention will now be explained with reference to FIG. 1.

Figure 1:
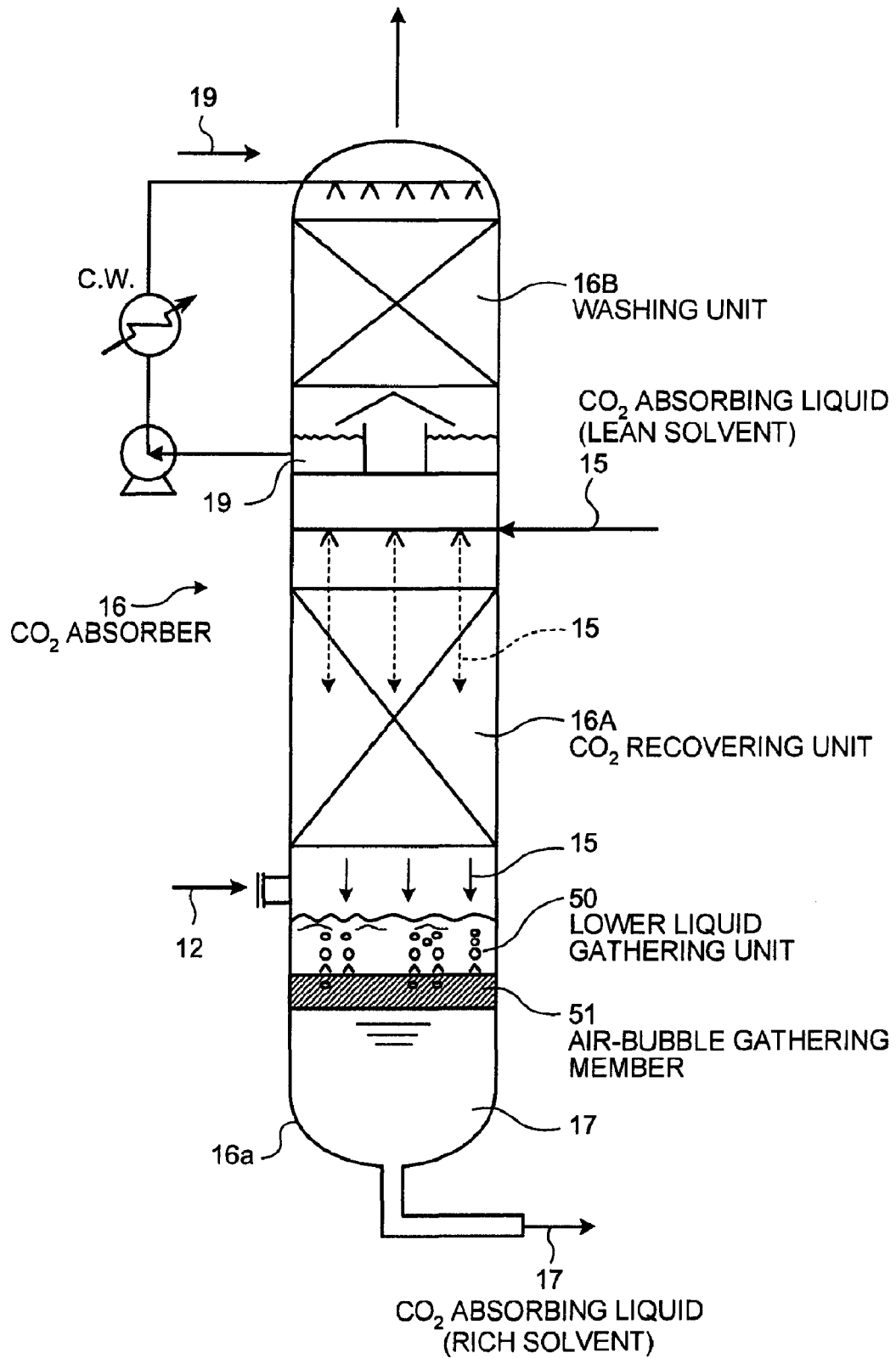
FIG. 1 is a schematic of a structure of a $CO_2$ recovering apparatus according to a first embodiment of the present invention.
Figure 2:
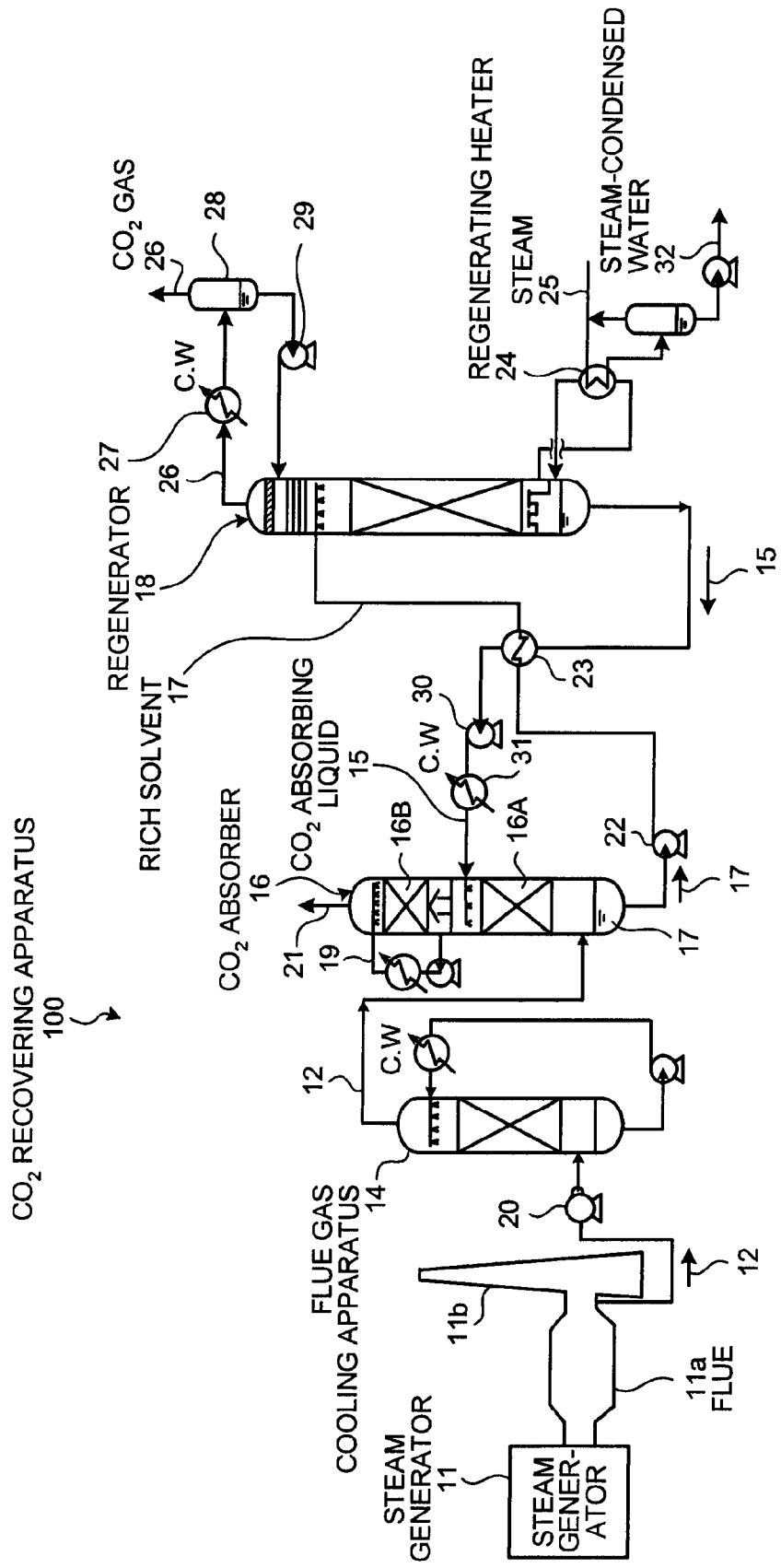
FIG. 2 is a schematic of an exemplary structure of a conventional $CO_2$ recovering apparatus.

FIG. 1 is a schematic diagram of a structure of the $CO_2$ recovering apparatus according to the first embodiment. In FIG. 1, the elements same as those in $CO_2$ recovering apparatus shown in FIG. 2 are assigned with the same reference numerals, and redundant explanations thereof are omitted.

FIG. 1 indicates the $CO_2$ absorber 16 included in the $CO_2$ recovering apparatus 100.

As shown in FIG. 1, the $CO_2$ recovering apparatus according to the first embodiment includes: the $CO_2$ absorber 16 that brings the flue gas 12 containing $CO_2$ and $O_2$ into contact with the $CO_2$ absorbing liquid (hereinafter, also referred to as "absorbing liquid") to reduce the $CO_2$ contained in the flue gas 12; a regenerator that reduces $CO_2$ in the $CO_2$ absorbing liquid (hereinafter, also referred to as "rich solvent") 17 that has absorbed the $CO_2$ in the $CO_2$ absorber 16, and regenerates the $CO_2$ absorbing liquid 17, so that the regenerated $CO_2$ absorbing liquid (hereinafter, also referred to as "lean solvent") 15 having the $CO_2$ reduced in the regenerator can be reused in the $CO_2$ absorber 16; and air-bubble gathering member 51 that gathers air bubbles included in the absorbing liquid in a lower liquid reservoir 50 located at the bottom 16a of the $CO_2$ absorber 16.

The air-bubble gathering member 51 is arranged so as to be dipped near or below the liquid surface of the lower liquid reservoir 50 located at the bottom 16a of the absorber 16.

The air-bubble gathering member 51 enables fine air bubbles included in the absorbing liquid, falling down into the lower liquid reservoir 50, to be gathered together. In this manner, the fine air bubbles are gathered into large ones so that the air bubbles floats onto the liquid surface. As a result, the air bubbles are removed from the lower liquid reservoir 50.

In this manner, the rich solvent 17 to be sent into the regenerator no longer contains air bubbles, and comes to contain only dissolved oxygen.

Examples of the air-bubble gathering member 51 include a wire mesh (e.g., a demister that condenses mist in the air) or a fiber bed (e.g., a coalescer that condenses mist in the air).

Other than assemblage such as the wire member or fibrous member (including layered body), the examples include a filler or sintered metal.

By installing the air-bubble gathering member 51 made of such a material, fine air bubbles in the absorbing liquid can be gathered so that the air bubbles floats onto the liquid surface. By gathering fine air bubbles in the absorbing liquid and allowing the air bubbles to float, it is possible to minimize the amount of air bubbles transported into the regenerator. Therefore, oxygen ($O_2$) and nitrogen ($N_2$) that are the gas components included in the flue gas 12 can be reduced. In this manner, it is possible to dramatically reduce the amount of gas components transported to the regenerator.

As described above, the $CO_2$ recovering apparatus according to the first embodiment includes the lower liquid reservoir 50 of the $CO_2$ absorber 16 having the air-bubble gathering member 51. Therefore, the air bubbles can be caught in the absorbing liquid 15 and gathered together to be removed therefrom. As a result, the only oxygen contained in the rich solvent 17 to be sent into the regenerator is those dissolved therein. In this manner, the concentration of oxygen contained in the $CO_2$ gas recovered from the regenerator can be reduced. Accordingly, sulfur component can be prevented from becoming deposited while the $CO_2$ gas recovered from the regenerator is compressed. Furthermore, when the $CO_2$ gas is used for the chemical applications, a problem such as deterioration of a catalyst can be solved.

Test Example

The air-bubble gathering member 51 was arranged in the lower liquid reservoir 50 of the $CO_2$ absorber 16; $CO_2$ in flue gas was reduced using an amine-based $CO_2$ absorbing liquid; and the oxygen concentration was measured. The test demonstrated that, before installing the air-bubble gathering member 51, the oxygen concentration of the rich solvent 17 was 54 parts per million; on the contrary, after installing the air-bubble gathering member 51 the oxygen concentration of the rich solvent 17 was reduced to approximately 16 parts per million, achieving approximately 70% of oxygen reduction.

According to the present invention, the air-bubble gathering member is provided to gather fine air bubbles included in the $CO_2$ absorbing liquid falling down into the lower liquid reservoir of the $CO_2$ absorber. In this manner, the fine air bubbles are gathered into large ones so that the air bubbles floats onto the liquid surface, and removed from the absorbing liquid. As a result, it is possible to dramatically reduce the amount of gas components transported to the regenerator.

What is claimed is:

1. A $CO_2$ recovering apparatus comprising:
  a $CO_2$ absorber that brings flue gas containing $CO_2$ and $O_2$ into contact with $CO_2$ absorbing liquid to reduce $CO_2$ in the flue gas, including a $CO_2$ recovering part;
  a regenerator that reduces $CO_2$ in rich solvent that absorbed $CO_2$ in the $CO_2$ absorber to regenerate the $CO_2$ absorbing liquid, so that lean solvent having $CO_2$ reduced in the regenerator is reused in the $CO_2$ absorber, wherein
  a lower liquid reservoir is located below the $CO_2$ recovering part of the $CO_2$ absorber,
  an air-bubble gathering member is located in the lower liquid reservoir of the $CO_2$ absorber to gather air bubbles included in the $CO_2$ absorbing liquid falling down into the lower liquid reservoir, the air bubbles containing oxygen, and
  the air-bubble gathering member is arranged so as to be dipped near or below a liquid surface of the lower liquid reservoir.

2. The $CO_2$ recovering apparatus according to claim 1, wherein the air-bubble gathering member is made of an assemblage of wire or fibrous material, or filler or sintered metal.

* * * * *